6363X
B. Reiley,
Vapor Bath.
Patented Feb. 5, 1831.
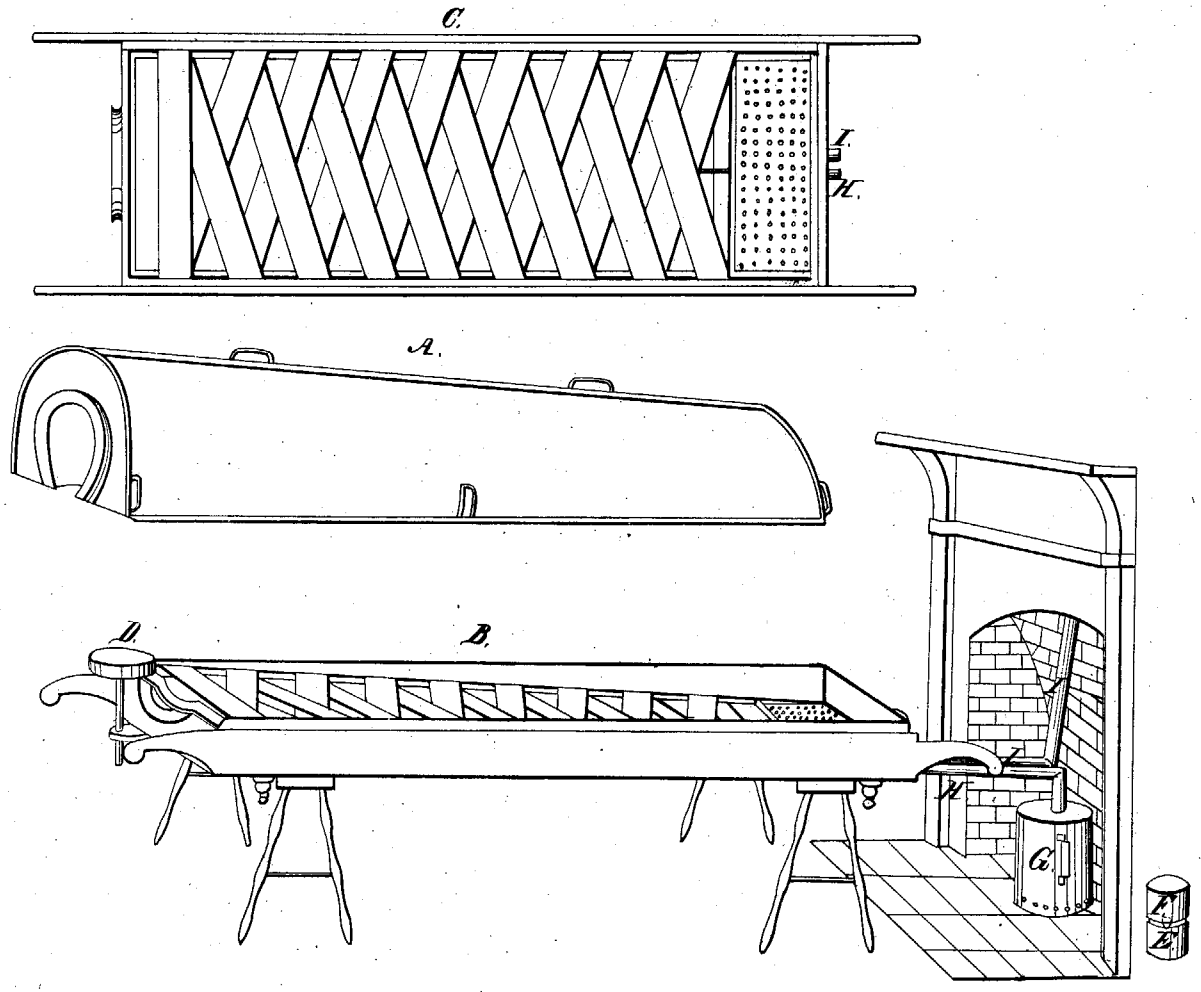
N. PETERS, PHOTO-LITHOGRAPHER, WASHINGTON, D. C.

Feb. 5. 1831 1.

Boyd Reilly X6363

The schedule referred to in these Letters Patent and mak-
ing part of the same containing a description in the
words of the said Boyd Reilly himself of his im-
provement in Apparatus for applying either simple
or medicated vapour, or steam, to the surface of the hu-
man body)

---

To all to whom these presents shall come. Be it known
that I Boyd Reilly of the City of Cincinnati in the
County of Hamilton and State of Ohio have invented
a new and useful improvement in apparatus for apply-
ing either simple or Medicated steam to the surface of the
Human body, with perfect ease and safety in the
chamber of the sick, and that the following is a full and
exact description of the construction and operation
of said apparatus as invented and used by me.
Figure A on drawing represents the top or cover, which
should be made the first, so that the wooden frame below
may be fitted perfectly tight to it, which, in using
medicated vapour in a close room is indispensable, A
frame square at the ends is formed of hoop iron one
inch and quarter in width, the frame to measure
five feet six inches in length and two feet in width,
an opening is left at one end in the centre to admit
the neck of the patient, the ends of the iron at this open-
ing are connected by a circular piece of sheet iron, which
encircles the patients neck, the inner circle of which is ten
inches in diameter and of the same substance as the frame
to which it is attached, one inch and a half is suppos-
ed to be cut in a straight line off this circle of ten in-
ches, which leaves the space at which the patients neck
is admitted. this circular plate must have a range of
holes

X6363 holes round its centre, two inches apart and counter
sunk on the inside, to suit the flat-headed rivets screws.
the circular plate is then attached to the frame with two
rivets at each end, being on the outside of the frame and
the ends of the circle kept one half inch from the lower
edge of the frame which half inch goes into the groove
of the wooden frame below. The hoop iron of which the
arched ribs are now formed, should be lighter than that of
which the frame has been formed, the ribs should be five
or seven in number according to the strength of the iron
used. the rib at the head should be sixteen inches
from the centre of the arch to the bottom of the frame,
the rib at the foot ten inches, the intermediate ribs
graduated by a straight line with the top, the ribs
connected by a straight length of the iron running
under the centre of the top with a rivet in each rib.
the ribs are attached to the frame on the out side,
within half an inch of the bottom line, with two rivets
in each end, except the ribs to which handles are
attached. one end of the handle [illegible] answering
in them for one of the rivets. The handles are made
of iron wire three eighths of an inch in diameter,
they are four inches in length and projected one inch
and a half. two of them are rivetted in the straight
centre piece of the top fifteen inches from each end.
they are to enable one person to remove the top or cov-
er, one of them is rivetted at the lower end of the ribs
at the head and foot, and the centre, they are for the
purpose of forcing the frame into the wooden groove to
which it will be fitted, the whole frame for the top
or cover being thus formed is covered on the outside
with strong unsized linen, the ribs being previously
covered with strips of the same [illegible] and [illegible] be
the the outsides. the cover laps round the lower edge of the frame
and is sewed there and at the edges of the head and foot
ends where the covering of the top is joined to the ends with
strong thread. the handles being let through the cover
and the openings for the same carefully closed. three
coats of varnish laid warm on the inside is gen-
erally sufficient to close up the pores of the linen and
prevent the escape of the vapour, and the action of
the Sulphur on the iron frame. To make the varnish
cut up two ounces of gum elastic into thin strips
put it into a quart of spirits of turpentine which
will soon reduce it to a jelly, then to one gallon
of linseed oil add one pound of litharge, one fourth
of a pound each of sugar of lead, and white vitriol,
and one large onion striped of its thin outer coats.
simmer the oil, driers and onion over a charcoal
fire in a copper vessel capable of holding a much larger
quantity, so that time may be afforded for removing
the oil from the fire when there is danger of its
boiling over. Stir the driers constantly from the
bottom and when the onion assumes a dark brown
colour the oil may be removed from the fire having
had time to settle, draw it off clear and add the gum
and turpentine when it is at blood heat, lay it on
warm with a brush. let each coat be well dried before
another is added. the varnish being dry cover the bot-
tom part of the frame all round with stout woolen
cloth, neatly joined, so as to leave the frame [illegible]
it fits smooth and [illegible]. The top may have
an ornamental cover of oil cloth or other stuff, the
handles covered with worsted binding or leather.
Figure B. on drawing represents the part of the appa-
ratus on which the patent relies. it consists of
the

X6363 two frames made of the inferior kind of Mahogany
or other wood combining lightness with strength. The
inner frame is made to fit exactly within the cloth-
covered edge of the top or cover. the sides and ends are
six inches wide or deep and three fourths of an inch
in thickness, dovetailed at the corners and rounded
at the upper edges, inside and out. a piece of stuff
of the same breadth and thickness is dovetailed or rab-
bitted flush into each end of the bottom, and a piece
three inches wide, across the centre of the same, two
ledges to which the webbing (on which the patient re-
clines) is attached, are secured to the inner sides with
glue and stout flat headed screws, countersunk on
the outside. these ledges run the whole length from
head to foot, inclining from the top of the frame
at the head, to the false or upper bottom at the
foot. they are one inch and a quarter in width,
and one inch in thickness. they have notches cut on
on the inside, one fourth of an inch in depth and
three inches in length, which is the width of the
webbing. the notches commence at two inches from
the head, and continue at intervals of three inches
to the inside or inner edge of the bottom board at the
foot. the inside of the notches and the outer edges of
the ledges, are rounded smooth to save the webbing from
wearing or cutting. The false or upper bottom spo-
ken of above, forms the passage by which the steam
escapes underneath. after having enveloped the pa-
tient. two pieces of pine wood. two inches and a
half in width at the foot, one inch at the head &
one inch in thickness. resting on the bottom boards in-
side are glued and nailed fast to the sides from head
to foot. a piece of pine five inches and half [illegible]

XC363 and half an inch in thickness and extending in
length from side to side is let into these pieces flush,
one half inch from the inside of the head board, leaving
a passage of half an inch for the escape of the steam be-
tween the head board and bottom, four similar
pieces placed edge to edge each four inches wide &
extending from side to side and let in flush, extend
from the centre towards the head, to sustain the weight
of the patient when he sits down, previous to reclin-
ing; one piece of the same six inches in width let in
flush and extending between the webbing ledges, joins
against the inside of the foot; as the admission pipe
from the furnace passes through this board and the
escape pipe is under it so that it may be sometimes neces-
sary to open it, it should be fastened with screws in-
to the side pieces. the other pieces should be nailed fast,
and being covered from the inner edge of the board at
the head to that of the foot with strong varnished linen
like the top. the false or upper bottom is thus formed,
and the steam is retained by covering the bottom of the
frame from head board to foot board in like man-
ner. The screw and nail heads inside the frame should
be carefully covered with putty to preserve them from
the corroding influence of the steam, and the tacks
which fasten the varnished linen on the upper bot-
tom may be secured by extending the edges of the linen
so as to turn over the tack heads, and fasten down
by introducing a little of the varnish between, —
The outer frame which the workman will (of course)
fasten on before he applies the double covering of linen
to the bottom, is fitted exactly to the inner frame,
the sides and ends five inches deep. three fourths of an
inch in thickness, and the sides extending nine inch-

X6363 at part each end, to form the handles, the corners are mitred. the inside of the upper edge all round rebbitted: so as to form a groove when attached to the inner frame half an inch depth, and wide enough to admit the cloth covered edge of the top or cover, fitting as close as possible, this groove may be slightly tapering towards the bottom, on the outer side, which has a tendency to press the inside of the top frame against the rabbit formed by the difference in depth between the two frames which is one inch. Care must be taken to fuse the top edge of the sides of one frame and the heart edge of the other frame together, which has a tendency to keep the sides from springing, and thereby opening the groove in which the top is fitted and letting the vapour escape .
The appearance of the outer frame is much improved by rounding or swelling the sides and ends so as to leave a substance of one fourth of inch on the outside of the frame. The outer frame is carefully glued and secured by screws to the inner frame, the screw heads being countersunk on the inside of the inner frame and not coming entirely through the outer frame, Four legs four inches long each are framed and glued into the lower edge of the outer frames near to the ends, so that they may have the support of the bot- end boards, they are for the purpose of keeping the elbows of the tin pipes hereafter to be described, and also the bottom clear of the ground when the apparatus is set down; legs of a sufficient height to apply the furnace and pipes to it, would be much in the way in taking it up to the chambers, so it is calculated to be placed on four common chairs, A wooden rim must be made to go round the neck of the patient the inner circle is ten inches in diameter, to correspond with the rim at the back of the cover in top. it is one inch and a quarter square

[illegible] should be made of two thicknesses glued together, the
grain of one crossing the other, the edge is deeply inden=
ted with a gouge all round, the inner edge is rounded
off so as to be easy to the patient, this rim is attached to
the iron [illegible] at the head, after the cover is put on, by
screws from the inside, the screw heads covered with
the oil cloth, the [illegible] cut off to suit the iron will
extend to the top of the [illegible] and be eight inches and
a half from the top of the inner circle to the edge of the
frame when the top is in its place, the piece of the
[illegible] cut off being one inch and a half inside, is let
into the head of the outer wooden frame so as to join
the upper part of the ring and there glued fast, it
will be necessary to reduce the thickness of this piece to
bring it even with the upper parts a piece of woollen
cloth should be glued to the ends of the upper part to make
the joint better, if the outer frame is rounded it will
be necessary to hollow out the end of the frame under the
circle to the depth of the round or swell. Figure
C on drawing represents the top of the wooden frame with
the way in which the [illegible] is applied entering both
ends at the two upper notches, and after crossing them
continue to enter them on the upper side all the way
to the ends, where they are secured by eyelet holes
and stout cord lacings, a piece of hard wood should be
run into a loop or sheath formed by lapping the ends
of the [illegible] below the [illegible]. The hole which admits the
steam at the bottom may be covered by a moveable piece
of thin board perforated, it is however of little consequence,
as none but the feet of very tall persons can reach the
aperture. Figure D. on drawing represents a circular

X6363

[illegible] on, it rests on a wooden screw twelve inches [illegible]
[illegible] and about one inch in diameter, which [illegible]
[illegible] in a piece of board twelve inches long, three
[illegible] wide and one inch thick, it is attached [illegible]
[illegible] bottom board at the head by a light sheet [illegible]
[illegible] or sheath, from which it may be drawn and
[illegible] inside when the apparatus is removed, the
[illegible] is raised or lowered to suit the convenien[illegible]
of the patient. Figure E on drawing represen[illegible]
[illegible] tin vessel four inches deep and three in diam[illegible]
[illegible] three pieces of double tin should be riveted a[illegible]
equal distances round the rim to raise the [illegible]
[illegible] on it about an inch. three half gills [illegible]
alcohol with an equal quantity of water will burn
about the time necessary for the patient to be in the
apparatus. alcohol undiluted burns with too
much violence. Figure F on drawing represents a
[illegible] vessel four inches deep and four inches diameter,
[illegible] will be found large enough to contain water for simple
[illegible] or sulphur &c for medicated vapour, if it is neces-
sary to use herbs a larger vessel will be requisite.
Figure G on drawing represents a cap or cover twelve
[illegible] deep and eight inches diameter. made of strong
[illegible] a handle riveted at the side, and a flange out[illegible]
[illegible] to receive pipe H. which conducts the steam [illegible]
the bottom of the apparatus. the vessels E & F are
placed under the cap or cover, the bottom being open
and the holes punched round the lower edge to admit
[illegible] air, pipe H is one inch and half diameter [illegible]
[illegible] with the cap or cover G and the vessels E & F [illegible]
[illegible] secured with rivets &c as not to depend on solder
which is soon melted by the sulphur, the pipe I [illegible]
[illegible] receives the steam after it [illegible] the pat[illegible]

XG363 and returned between the bottoms to be conducted up the chimney) may be simply soldered, it is two inches diameter. an elbow for each of these pipes being one inch apart is secured to a plate of tin which is fastened in the centre of the bottom board at the foot of the machine. the tin plate extending to the outer edge to prevent the heat from the furnace pipe H. scorching the wood. this pipe must be conducted thro' both bottoms by a pipe flanged on the top so that it may not come in contact with the upper or lower bottom boards, the holes for its admission through which being at least two inches diameter. the lapping of the pipes at joints and elbows will of course be regulated by the course of the current of steam, the same as the pipe of a stove for the smoke, To prevent the escape of the vapour thro' the opening at the head a band is made of strong silk coated on both sides with the gum varnish. this band (or bag open at both ends) must be long enough in circumference, to pass over the wire at the head, it is twelve inches in length and covered on both sides with unvarnished silk or other thin material, the varnish feeling unpleasant to the patients neck around one end is a drawing string. the string long enough to pass round the outside of the bag after it has been drawn tight round the wire. when using sulphur it cannot be made too secure. The patient should be divested of all his clothing unless he should wear a flannel dress next his skin. should not that be the case, a loose flannel wrapper may be worn. the bag is put round the neck, the drawing string end next to the shoulders, the other end being laid in plaits or folds round the neck, kept in their places by the grasp of the operator. a large silk hand kerchief is passed

X6363 lapped round, first under the edge, then above it,
and drawn as tight as convenient to the patient when
sulphur is used, it discolours the skin of the hands
until the scarf skin peels off. this may be prevented
if desired, by having coverings for them of the same
material as that of the neck, the penetrating nature
of the sulphur causes it to be painful to the testicles.
they should be covered by a bag made in like manner
(this part of the preparation may be omitted with
females.) the patient thus prepared should be
seated on the frame between the centre and the
head, reclining then on his side (which is the best
position, if however the back is preferred the cushion
for the head must be screwed down nearly to a level
with the bottom or sacking) his head resting on the
cushion which should be elevated as high as conven-
ient to him. the top is put on and carefully [illegible] -
brought to its proper depth in the groove, the bag secured
round the rim, as already explained, the alcohol
ignited and the cap and pipe attached. Although
I have made this application some hundreds of times,
being a Mechanic I require the patient to take
medical advice in cases of difficulty in simple
cutaneous or rheumatic cases, I pursue the following
course. If the patients skin is in a dry state I gen-
erally cause perspiration in a few minutes by steam
from half a pint of water placed over the alcohol in
the tin vessel, perspiration appearing on the fore-
head is the proof, the heat and condensed vapour
inside often deceiving the patient. the water being re-
moved, a full half ounce of roll brimstone is put in the
[illegible] vessel, which in this small apparatus takes
as long to burn, as the patient can [illegible] [illegible]

X6363 main in it, the fire must be kept up fifteen minutes
after the sulphur has burned out, to discharge the fume
by the current of heated air, a strong odor will however
remain, so that it will be necessary to raise
the upper end of the top (having made it loose all round)
sufficiently high to let the patient out, it must then
be replaced and the apparatus quickly removed from
the apartment. In the recumbent position, the
patient seldoms feels faint, unless previously reduced.
should such symptoms appear the sulphur may be removed
to the back of the fire place. the alcohol still kept burning
in its place. the usual applications made to the pa-
tient such as admission of fresh air vinegar. cool
water &c to the face, but the patient must remain in
the apparatus, where he will be as well as any where
else till the fume is discharged. some of my med-
ical friends here have just informed me that cam-
phor has been latterly used as a good substi-
tute for the sulphur, in rheumatic cases. I feel
convinced by much experience of the utility of out-
ward applications; I leave improvements, however, in
them, to those capable of making them, hoping that my
humble efforts will afford improved means for their
use. As females have often been much terrified at
being confined in an apparatus evidently communi-
cating with the fire, I have planned a fixed bath
which may be made ornamental to a bathing es-
tablishment or private dwelling, the principle the
same, it may have the outward appearance of a bed
&c, the legs at the lower end or foot of the machine
being hollow, the furnace may be placed in an adjoin-
ing room, the fume or steam conveyed in a pipe un-
der

X6363 der a raised floor, or through the floor from an
apartment below admitted through one leg, &
discharged by the other. In a room without a
fireplace, the portable apparatus may be used
by having an additional elbow to the escape pipe,
it can be put out of the window, the opening at
each side filled up with a blanket &c, should a
close stove be used it may be introduced into it,
in the absence of a fire place or hearth however,
some convenient nonconductor of heat should be
placed between the furnace and the floor.

Witnesses
Charles Fisher
Benj^n T. Reilly

Boyd Reilly 3750 wd